United States Patent
Luo et al.

(10) Patent No.: US 8,151,038 B2
(45) Date of Patent: Apr. 3, 2012

(54) SSD WITH A CHANNEL MULTIPLIER

(75) Inventors: Jianjun Luo, Los Gatos, CA (US); ChuanJen Tsu, Saratoga, CA (US); Jui Chuan Liang, San Jose, CA (US); Minhorng Ko, San Jose, CA (US)

(73) Assignee: Initio Corporation, San Jose, CA (US)

( * ) Notice: Subject to any disclaimer, the term of this patent is extended or adjusted under 35 U.S.C. 154(b) by 382 days.

(21) Appl. No.: 12/468,683

(22) Filed: May 19, 2009

(65) Prior Publication Data

US 2009/0300258 A1   Dec. 3, 2009

Related U.S. Application Data

(60) Provisional application No. 61/056,320, filed on May 27, 2008, provisional application No. 61/056,308, filed on May 27, 2008.

(51) Int. Cl.
*G06F 12/00* (2006.01)
(52) U.S. Cl. ......... 711/103; 711/100; 711/154; 711/200
(58) Field of Classification Search .................. 711/100, 711/101–106, 154, 200
See application file for complete search history.

(56) References Cited

U.S. PATENT DOCUMENTS

| | | |
|---|---|---|
| 2005/0120157 A1 | 6/2005 | Chen et al. |
| 2007/0158808 A1 | 7/2007 | Bruce et al. |
| 2007/0180328 A1 | 8/2007 | Cornwell et al. |
| 2008/0016269 A1 | 1/2008 | Chow et al. |
| 2008/0040531 A1 | 2/2008 | Anderson |
| 2008/0082736 A1 | 4/2008 | Chow et al. |
| 2008/0114924 A1 | 5/2008 | Frayer et al. |
| 2008/0155160 A1* | 6/2008 | McDaniel ..................... 710/306 |

FOREIGN PATENT DOCUMENTS

WO   PCT/US2009/045326   7/2009

OTHER PUBLICATIONS

International Search Report and Written Opinion mailed Nov. 5, 2009 in connection with PCT application No. PCT/US09/45329.

* cited by examiner

*Primary Examiner* — Thong Q Le
(74) *Attorney, Agent, or Firm* — Duane Morris LLP (57) ABSTRACT

An integrated circuit includes a first serial advanced technology attachment (SATA) channel, a plurality of second SATA channels, and a channel multiplier. The first SATA channel is configured to be coupled to a corresponding serial data bus of a host device. Each of the plurality of SATA channels is configured to be coupled to a respective separate memory device channel. The channel multiplier is configured to couple the first SATA channel to each of the plurality of second SATA channels.

20 Claims, 7 Drawing Sheets

SSD WITH A CHANNEL MULTIPLIER

CROSS-REFERENCE TO RELATED APPLICATIONS

This application claims priority to U.S. Provisional Patent Application No. 61/056,320, filed on May 27, 2008, and to U.S. Provisional Patent Application No. 61/056,308, filed on May 27, 2008, which are incorporated by reference herein in their entireties.

FIELD OF DISCLOSURE

The disclosed embodiments relate to storage devices. More specifically, the disclosed embodiments relate to solid-state drives.

BACKGROUND

Solid-state drives (SSD) are a form of data storage that use a solid-state memory to store data. Examples of solid state memory include static random access memory (SRAM), dynamic random access memory (DRAM), and flash memory. Unlike conventional disk drives that include several moving components, an SSD does not have moving parts as the data are electronically stored and not stored on a rotating disk. Since an SSD does not store data on a rotating disk, SSDs experience fewer mechanical failures than conventional hard disk drives having many moving parts. Additionally, SSDs have a faster startup time than conventional hard disk drives as they do not require time for a disk to spin up to a particular speed in order for data to be written to or read from the disk.

An SSD may comprise a plurality of NAND flash memory cells or DRAM memory cells. In some implementations, NAND flash memory is a single-level cell (SLC) that stores a single bit of data per cell. Multi-level cell flash memories (MLC) store two bits of data per cell. Accordingly, MLC flash has a higher density than that of SLC flash, and due to its lower price and higher capacity, MLC flash is more commonly used in an SSD than SLC flash.

Although the capacity of SSDs continues to increase, a tradeoff is typically made between read and write speed and memory capacity. Conventional flash memory architecture utilizes a single flash controller for each flash group to which the flash controller is connected. Each flash controller coordinates the read, write, and erase cycles for the flash groups to which it is connected. If additional memory is required by a host system, an additional SSD component is added to the host device requiring the host to have an additional connection port. Accordingly, the capacity of an SSD is limited by the number of connections available on a host device.

Accordingly, an improved solid-state flash memory architecture is needed.

SUMMARY

In some embodiments, an integrated circuit includes a first serial advanced technology attachment (SATA) channel, a plurality of second SATA channels, and a channel multiplier. The first SATA channel is configured to be coupled to a corresponding serial data bus of a host device. Each of the plurality of SATA channels is configured to be coupled to a respective separate memory device channel. The channel multiplier is configured to couple the first SATA channel to each of the plurality of second SATA channels.

In some embodiments, a solid state drive (SSD) includes a first serial data bus of a first type, a channel multiplier, and a plurality of memory controllers. The first serial data bus of the first type is configured to be coupled to a corresponding serial data bus of a memory channel of a host device. The channel multiplier is coupled to the serial data bus of the first type and is configured to split data from the first serial data bus among a plurality of serial data buses of a second type. Each of the memory controllers is coupled to a respective serial data bus of the second type. Each of the memory controllers is configured to manage data flow between the channel multiplier and a respective memory device in signal communication with the memory controller.

In some embodiments, a memory system includes a serial data bus of a first type, a channel multiplier, and a plurality of memory controllers. The serial data bus of the first type is configured to be coupled to a corresponding serial data bus of a host device. The channel multiplier is coupled to the serial data bus of the first type and is configured to split data from the serial data bus of the first type among a plurality of serial data buses of a second type. Each of the memory controllers is coupled to a respective serial data buses of the second type. Each of the memory controllers includes a plurality of processors of a first type and a processor of a second type. Each of the plurality of processors of the first type is coupled to a respective flash memory device. The processor of a second type is configured to manage data transmission between the flash memory devices and the channel multiplier.

DETAILED DESCRIPTION

Figure 1:
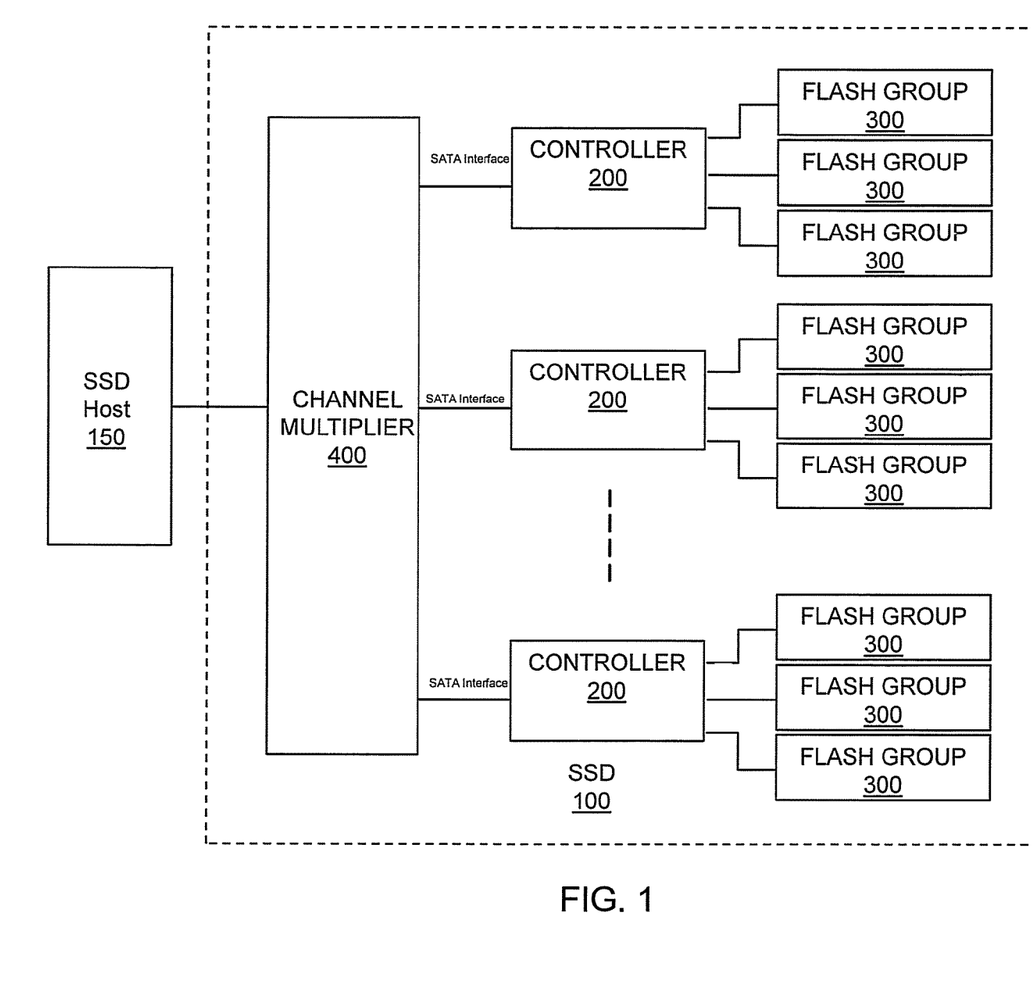
FIG. 1 is a block diagram of one example of an architecture of a solid-state drive (SSD).

FIG. 1 is a block diagram of one example of an SSD 100 connected to a host 150. Host 150 may be a personal computer such as a laptop or desktop, a workstation, a server, or any device having a central processing unit (CPU). Additionally, host 150 may be configured to run an operating system including, but not limited to, Microsoft® Windows, Linux, UNIX, Mac OS X, FreeBSD®, or the like. As shown in FIG. 1, SSD 100 includes a channel multiplier 400, controllers 200, and flash groups 300. Controller 200 may be a microcontroller, microprocessor, or like device configured to perform management of flash groups 300. Flash groups 300 may be SLC flash groups or MLC flash groups storing two or more memory bits per flash unit. In some embodiments, SSD 100 may be implemented as a single chip while in other embodiments SSD 100 may be implemented using one or more chips.

Figure 2:
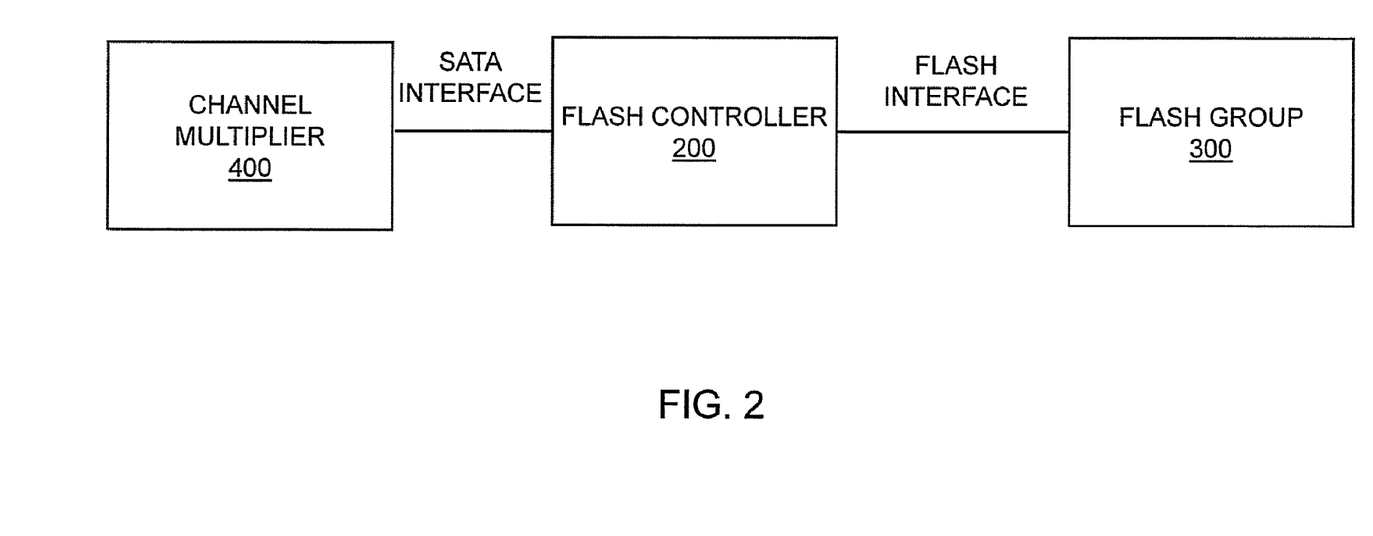
FIG. 2 is a block diagram of one example of a connection between the channel multiplier, the controller, and a flash group illustrated in FIG. 1.

FIG. 2 is a block diagram of the interface between the channel multiplier 400, the controller 200, and a flash group 300. As shown in FIG. 2, flash group 300 may be connected to flash controller 200 via a flash interface. Controller 200 may be connected to channel multiplier 400 through a serial advanced technology attachment interface (SATA) or a universal serial bus (USB) interface. One skilled in the art will appreciate that other interfaces used for data transfer may also be used to connect flash controller 200 and channel multiplier 400 to each other.

Figure 3:
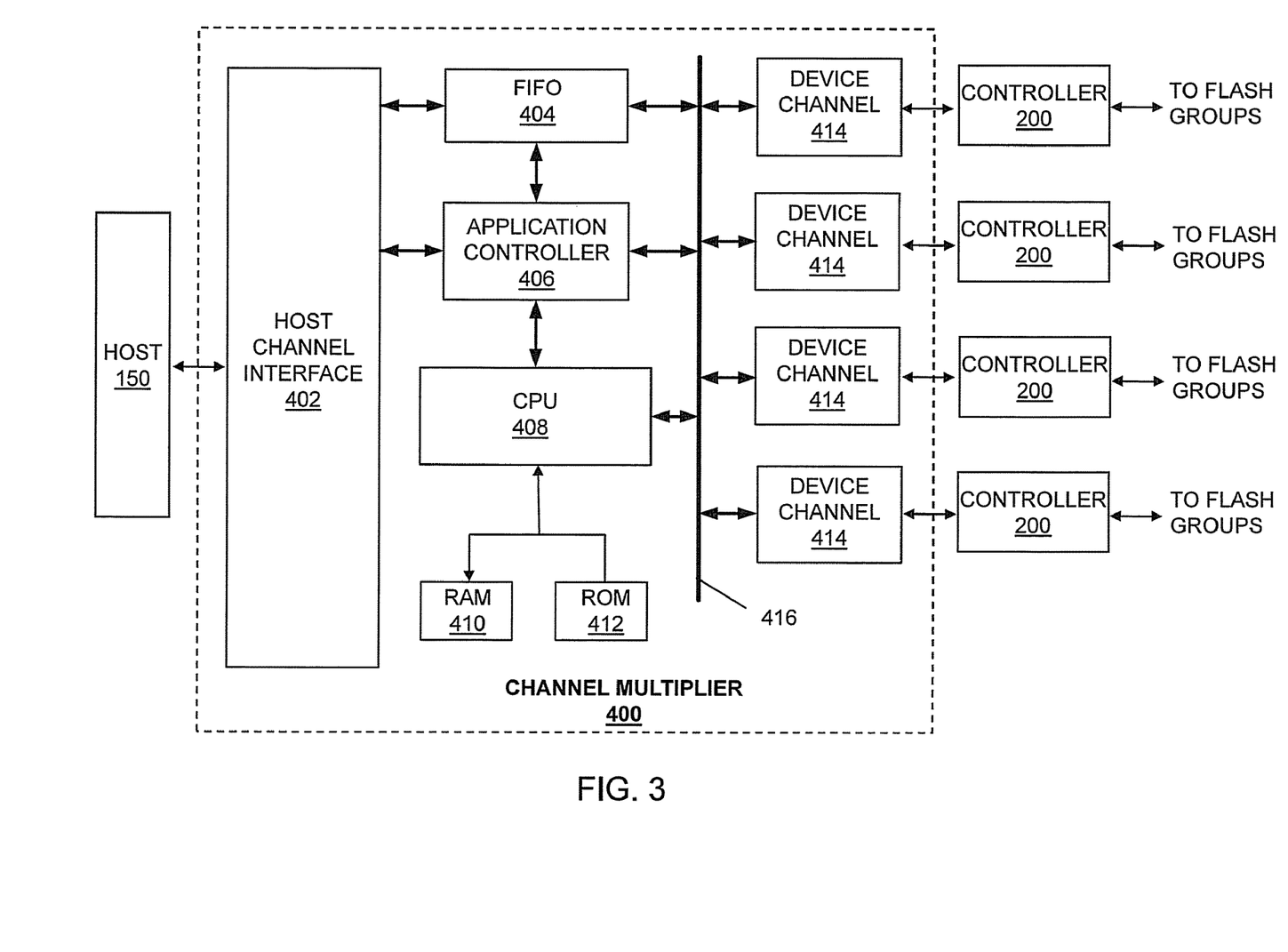
FIG. 3 is a block diagram of one example of a channel multiplier in accordance with the SSD illustrated in FIG. 1.

FIG. 3 is a block diagram of one example of a channel multiplier 400. Channel multiplier 400 is configured to connect a serial data bus of a first type (e.g., a single host connection) to a plurality of serial data buses of a second type (e.g., SATA channels). Examples of SATA channels include, but are not limited to, SATA, SATA II, SATA III, and eSATA channels. In some embodiments, channel multiplier 400 may be configured to connect a plurality of USB channels to a single host connection. Examples of USB channels include, but are not limited to, a USB 2.0 channel and a USB 3.0 channel.

As shown in FIG. 3, channel multiplier 400 includes a host channel interface 402 configured to connected to a corresponding interface of a host 150. The host channel interface 402 may be a SATA, USB, or like interface connection. A first-in-first-out register (FIFO) 404 is connected to host channel interface 402 and device channels 414 through a data bus 416. FIFO 404 is configured to be a data buffer for data being transmitted between host 150 and the flash groups 300.

An application controller 406 is also connected to host channel interface 402 as well as to a CPU 408 and to the device channels 414. In some embodiments, device channels 414 may be SATA channels although it will be understood that other channel types may be implemented. CPU 408 is connected to a RAM 410, ROM 412 and to the device channels 414. CPU 408 may be any computational device including, but not limited to, a microprocessor, microcontroller, or the like. CPU 408 is configured to execute firmware instructions that may be loaded from ROM 412 into RAM 410. RAM 410 may be any type of random access memory such as, for example, static random access memory (SRAM) or dynamic random access memory (DRAM). ROM 412 may be any type of read only memory including, but not limited to, programmable read only memory (PROM), erasable programmable read only memory (EPROM), or electrically erasable programmable read only memory (EEPROM). Application controller 406 is configured to manage the transmission of data between host 150 and the flash groups 300. For example, when data are being transferred from the host 150 to the flash groups 300, the application controller 406 may distribute data to one or more flash groups 300. When data are being transferred from flash blocks 300 to host 150, application controller 406 may organize data from different flash blocks 300 into a single block of data, which is then transferred to host 150.

Figure 4:
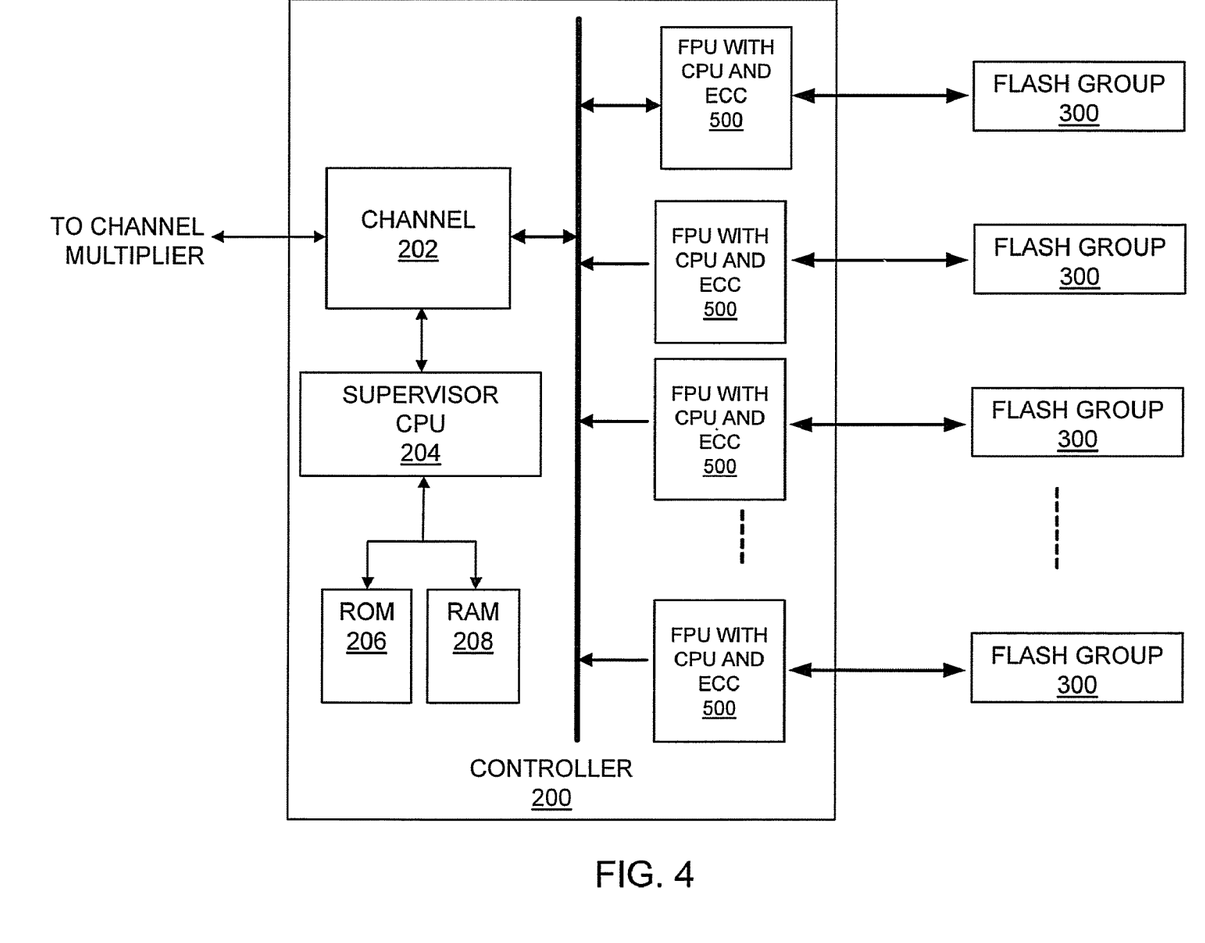
FIG. 4 is a block diagram of one example of a controller having a distributed processor architecture.

The device channels 414 may be connected to respective controllers 200 through an interface such as a SATA, USB, or like interface. The controller 200 may be a conventional memory controller configured to manage one or more flash groups 300. In some embodiments, controller 200 may have a distributed architecture as illustrated in FIG. 4. As shown in FIG. 4, controller 200 includes a channel 202, a supervisor CPU 204, a read only memory (ROM) 206, a random access memory (RAM) 208, and one or more flash processor units (FPU) 500.

Controller 200 may be configured to act as a bridge between channel multiplier 400 and the FPUs 500 to enable data transfer between the flash groups 300 and channel multiplier 400. In one embodiment, channel 202 is a SATA channel, although one skilled in the art will understand that channel 202 may be another type of channel such as, for example, a USB channel.

Supervisor CPU 204 may be a processor, microprocessor, microcontroller, or like device configured to manage the data transfer between the channel multiplier 400 and each of the FPUs 500 by executing firmware instructions that may be stored in ROM 206. ROM 206 may be any type of read only memory including, but not limited to, programmable read only memory (PROM), erasable programmable read only memory (EPROM), or electrically erasable programmable read only memory (EEPROM). RAM 208 may be any type of random access memory such as, for example, static random access memory (SRAM), or dynamic random access memory (DRAM).

Figure 5:
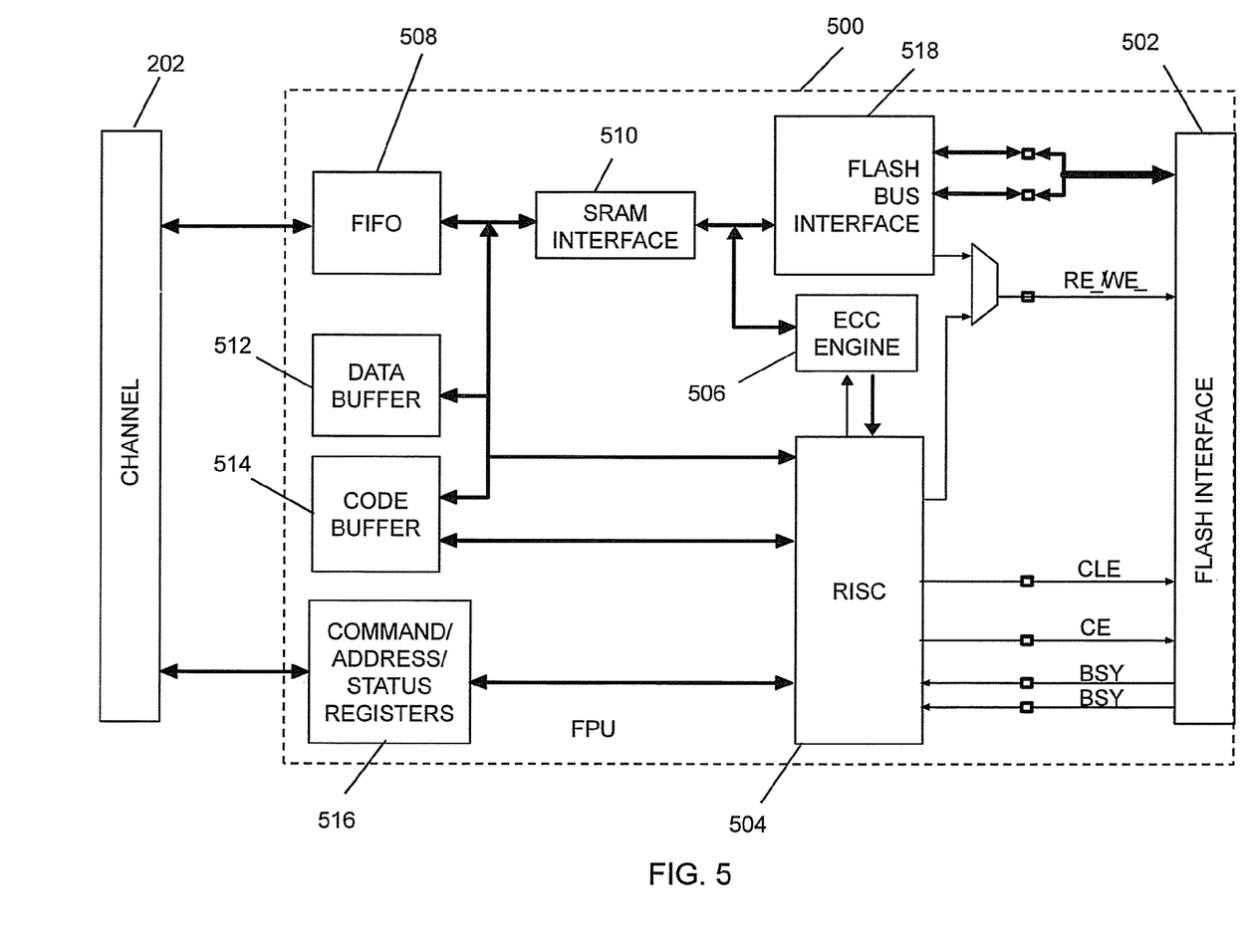
FIG. 5 is a block diagram illustrating one example of the structural and functional components of a flash processing unit in accordance with the controller illustrated in FIG. 4.

FIG. 5 is a block diagram illustrating one example of the structural and functional components of an FPU 500. As shown in FIG. 5, FPU 500 may include a First-In-First-Out (FIFO) register 508 that may be connected to the channel 202, an SRAM interface 510, a data buffer 512, a code buffer 514, and a reduced instruction set computer (RISC) 504. In some embodiments, each RISC 504 is an 8-bit RISC, although RISCs having other processing capabilities may be used. Command/address/status registers 516 may also be connected to channel 202 and to RISC 504. SRAM interface 510 may be connected to a flash bus interface 518 and an error correction code (ECC) engine 506. ECC engine 506 may be connected to RISC 504. Flash bus interface 518 and RISC 504 may be connected to the flash interface 502.

In some embodiments, FIFO 508 may be 2K by 32 bit data FIFO formed from SRAM. Similarly, data buffer 512 and code buffer 514 may also be implemented using SRAM, although one skilled in the art will understand that FIFO 508, data buffer 512, and code buffer 514 may be implemented using other memory types or registers. FIFO 508, data buffer 512, and code buffer 514 are configured to receive and buffer the data received from or being transmitted to channel 202 via SRAM interface 510 and flash bus interface 518.

ECC engine 506 may be configured to execute an error correction code to perform error correction on data being written to or read from a flash group 300 in conjunction with RISC 504. For example, the ECC may be a Hamming code, a Reed-Solomon code, or like code that may be used to determine and correct data errors. Additionally, RISC 504 may be configured to perform wear-leveling, bad block management, and other operations conventionally performed by a single flash controller. For example, a table may be stored in the flash groups 300 identifying the location of one or more bad blocks of data. These bad blocks may be the result of over-use and will be skipped when a data read/write is executed. Each FPU 500 may include its own firmware that may be different from the firmware of other FPUs 500 enabling each FPU 500 to perform different operations as well as enabling different types of flash blocks 300 to be connected to controller 200. For example, a flash group 300 comprising a plurality of SLC flash units 304 (FIG. 6) may be connected to one FPU 500 and another flash group 300 may be comprised of a plurality of MLC flash units 304 all of which may be managed by a single controller 200.

Figure 6:
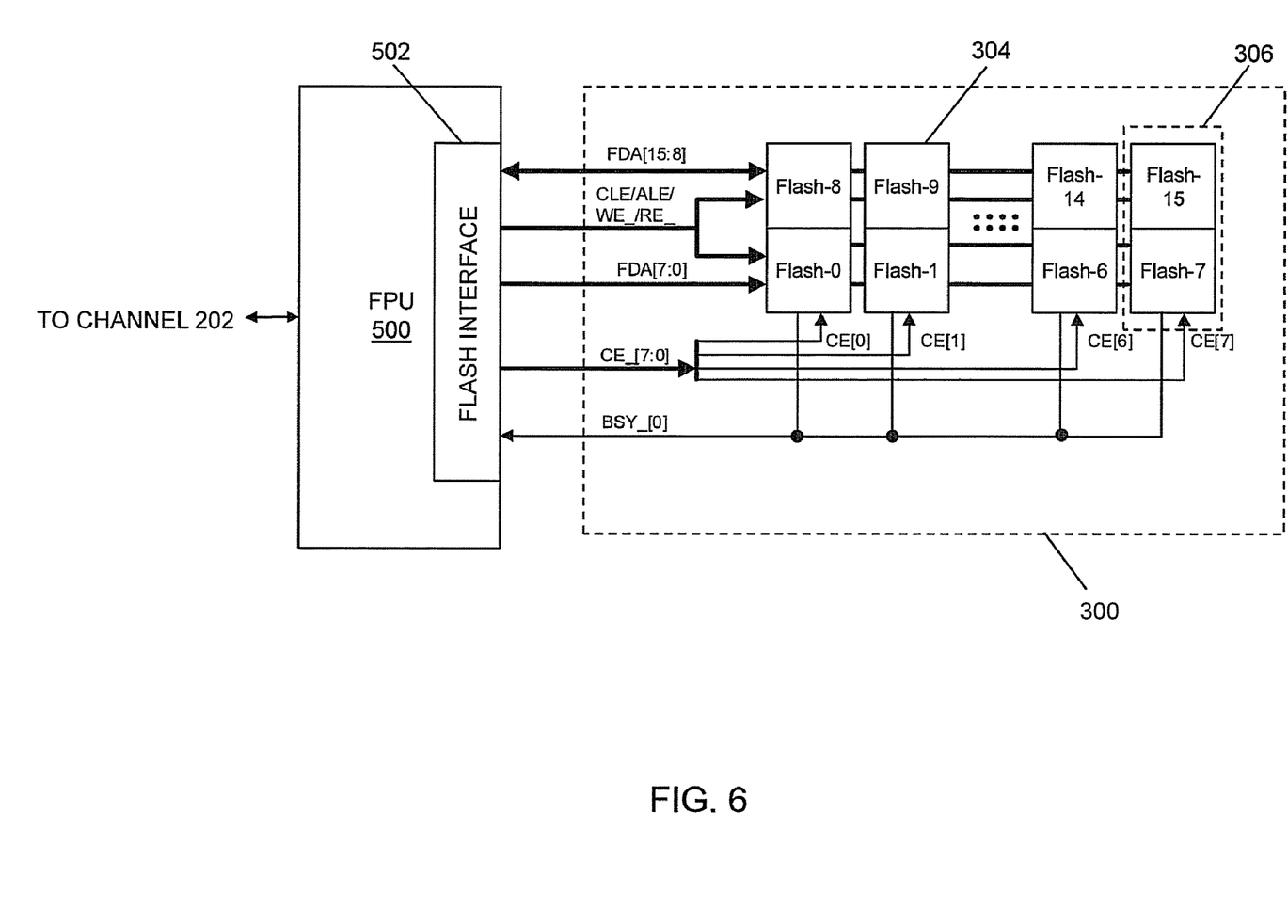
FIG. 6 is a block diagram of one example of a connection between a flash processing unit and a flash group.

FIG. 6 is a block diagram of one example of a connection between an FPU 500 and a flash group 300. Each FPU 500 may include a flash interface 502 through which the FPU 500 connects to a flash group 300. Flash interface 502 may include logic circuitry configured to select and deselect a flash sub-group 306 or a flash unit 304. Each flash sub-group 306 may have a respective Chip Enable signal (CE), and all of the flash units 304 may be connected to the same flash control signal lines including, but not limited to, Command Latch Enable (CLE), Read (RE), and Write (WE) signal lines.

Figure 7:
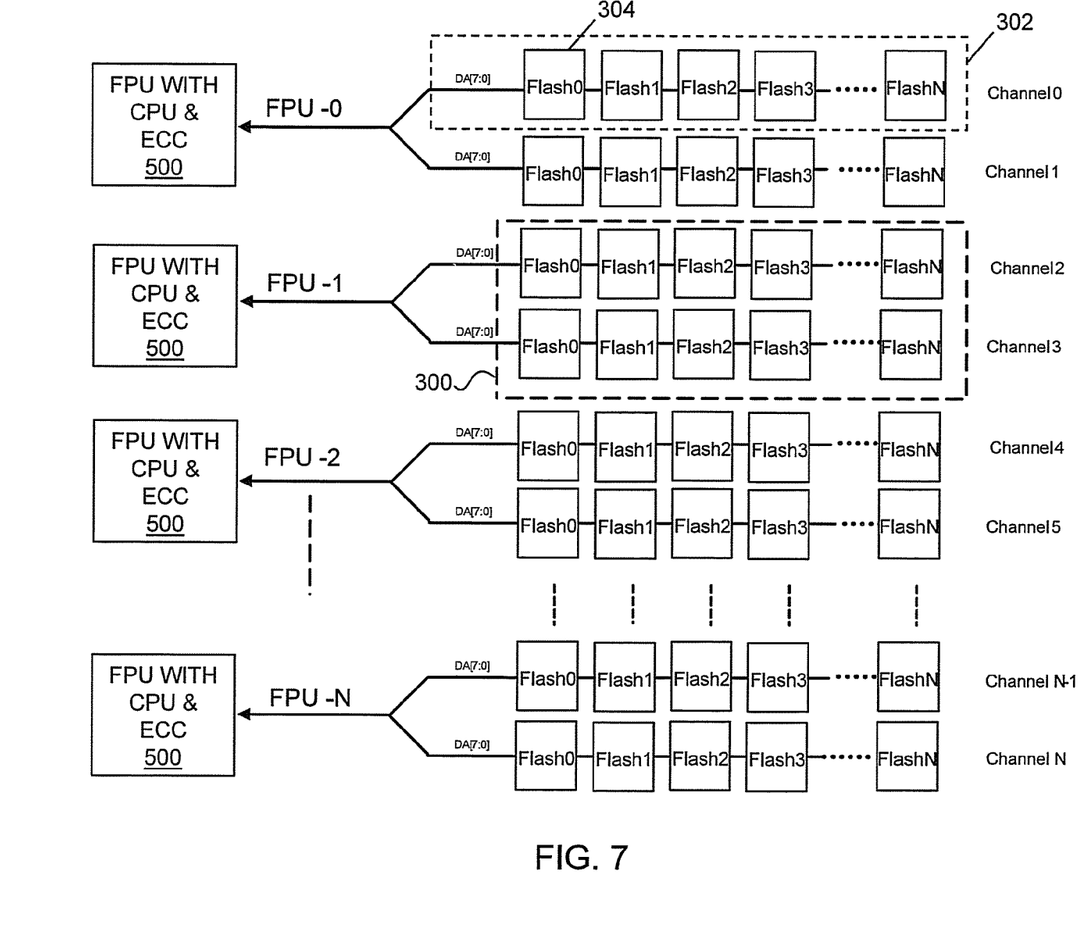
FIG. 7 is a block diagram of one example of a plurality of FPUs each connected to a plurality of channels of flash memory.

In some embodiments, FPUs 500 may be configured to support interleaving operations to support the connection of one or more channels 302 of flash memory. FIG. 7 is a block diagram of one example of a plurality of FPUs 500 each connected to two flash channels 302. With each FPU 500 configured to support interleaving operations and being connected to two flash channels 302, the memory capacity of SSD 100 of host 150 may be increased.

With reference to FIGS. 1-6, the operation of SSD 100 is now described. When host 150 is powered on, ROM 412 loads the firmware into RAM 410 so that it may readily be accessed by CPU 408. CPU 408 of channel multiplier 400 executes its firmware instructions and sends commands to the device channels 414 and to application controller 406. As described above, each of the controllers 200 may be configured with their own firmware that is loaded from ROMs 206. The firmware loaded from ROM 206 may be specific to the operations that the supervisor CPU 204 will perform. For example, the firmware may instruct the supervisor CPU 204 to manage data transfer between the channel multiplier 400 and each of the FPUs 500. Put another way, the supervisor CPU 204 may receive a data read or write request from channel multiplier 400 by way of device channel 414, which supervisor CPU 204 may then route to the appropriate FPU 500. In this manner, the supervisor CPU 204 may act as a bus arbiter by coordinating the read and write requests from channel multiplier 400 among the FPUs 500.

FPUs 500, each having their own firmware, may receive the data read or write request and access the appropriate one or more flash units 304 of a flash group 300. FPUs 500 may perform error correction on the data being retrieved from flash groups 300. Additionally, FPUs may perform wear-leveling and bad block management operations that are conventionally performed by a single flash controller.

The distributed processor architecture of the controller 200 reduces the workload of the supervisor CPU 204 by distributing the work among a plurality of RISC FPUs 500 thereby reducing latency times and enabling higher data transfer rates than may be achieved by conventional architectures. Additionally, the distributed architecture enables a single controller 200 to support various flash types, e.g., SLC, MLC, or a combination thereof, providing the flexibility to manufacture an SSD with an improved blend of reliability and performance.

The SSD 100 as shown and described herein advantageously increases the storage capacity by connecting a plurality of flash groups to the host through a single channel connection. If a channel multiplier is implemented in conjunction with a controller having a distributed architecture as described above, a single connection to a host may be able support a plurality of channels of SSD memory. For example, a channel multiplier may be configured to split a single host channel into two separate channels. Each of the two channels may be configured with a controller having four flash processor units each configured to drive 16 flash chips. Accordingly, 128 flash chips may be connected to a single connection port of a host.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An integrated circuit, comprising:
   a first serial advanced technology attachment (SATA) channel configured to be coupled to a corresponding serial data bus of a host device;
   a plurality of second SATA channels, each of the plurality of SATA channels configured to be coupled to a respective separate memory device channel; and
   a channel multiplier configured to couple the first SATA channel to each of the plurality of second SATA channels.

2. The integrated circuit of claim 1, wherein the channel multiplier includes a processor configured to manage data transmission between the first SATA channel and each of the plurality of second SATA channels.

3. The integrated circuit of claim 1, wherein the channel multiplier includes a first-in first-out (FIFO) register in data communication with the processor and each of the plurality of second SATA channels, the FIFO configured to buffer data transmitted between the first SATA channel and each of the plurality of second SATA channels.

4. The integrated circuit of claim 1, wherein each of the plurality of second SATA channels are configured to be coupled to a channel of flash memory.

5. A solid state drive (SSD), comprising:
   a first serial data bus of a first type configured to be coupled to a corresponding serial data bus of a memory channel of a host device;
   a channel multiplier coupled to the serial data bus of the first type, the channel multiplier configured to split data from the first serial data bus among a plurality of serial data buses of a second type, wherein the channel multiplier includes a first-in first-out (FIFO) register in data communication with each of the serial data buses of the second type; and
   a memory controller coupled to each of the plurality of the serial data buses of the second type, each of the memory controllers configured to manage data flow between the channel multiplier and a respective memory device in signal communication with the memory controller.

6. The SSD of claim 5, wherein each of the memory controllers is coupled to a plurality of memory devices.

7. The SSD of claim 6, wherein each of the memory controllers include:
   a plurality of processors of a first type, each of the plurality of processors of the first type coupled to a respective one of the plurality of memory devices; and
   a processor of a second type configured to manage data transmission between the plurality of memory devices and the channel multiplier.

8. The SSD of claim 7, wherein each of the plurality of processors of the first type are configured to perform wear-leveling for the respective memory device to which it is coupled.

9. The SSD of claim 7, wherein each of the plurality of processors of the first type are configured to execute an error correction code for the respective memory device to which it is coupled.

10. The SSD of claim 5, wherein the memory device is a flash memory device.

11. The SSD of claim 5, wherein the serial data bus of the first type is a serial advanced technology attachment (SATA) channel.

12. The SSD of claim 5, wherein the serial data bus of the first type is a universal serial bus (USB) channel.

13. A memory system, comprising:
a serial data bus of a first type configured to be coupled to a corresponding serial data bus of a host device;
a channel multiplier coupled to the serial data bus of the first type, the channel multiplier configured to split data from the serial data bus of the first type among a plurality of serial data buses of a second type; and
a memory controller coupled to each of the plurality of serial data buses of the second type, each of the memory controllers including:
a plurality of processors of a first type, each of the plurality of processors of the first type coupled to a respective flash memory device, and
a processor of a second type configured to manage data transmission between the flash memory devices and the channel multiplier.

14. The memory system of claim 13, wherein each of the plurality of processors of the first type are configured to perform wear-leveling for the respective memory device to which it is coupled.

15. The memory system of claim 13, wherein each of the plurality of processors of the first type are configured to execute an error correction code for the respective memory device to which it is coupled.

16. The memory system of claim 13, wherein the serial data bus of the first type is a serial advanced technology attachment (SATA) channel.

17. The memory system of claim 13, wherein each of the plurality of serial data buses of the second type are serial advanced technology attachment (SATA) channels.

18. The memory system of claim 13, wherein at least one of the flash memory devices includes multi-level cell flash.

19. The memory system of claim 18, wherein at least one of the flash memory devices includes single-level cell flash.

20. The memory system of claim 13, wherein at least one of the flash memory devices includes single-level cell flash.

* * * * *